United States Patent
Haller et al.

(10) Patent No.: US 10,017,081 B2
(45) Date of Patent: Jul. 10, 2018

(54) VEHICLE VIBRATION DEVICE

(71) Applicant: GRAMMER AG, Amberg (DE)

(72) Inventors: Erwin Haller, Birgland (DE); Jens Kolb, Koenigstein (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/370,233

(22) Filed: Dec. 6, 2016

(65) Prior Publication Data

US 2017/0166098 A1 Jun. 15, 2017

(30) Foreign Application Priority Data

Dec. 14, 2015 (DE) .................. 10 2015 121 765

(51) Int. Cl.
*B60N 2/52* (2006.01)
*B60N 2/39* (2006.01)
*B60N 2/50* (2006.01)

(52) U.S. Cl.
CPC ............. *B60N 2/39* (2013.01); *B60N 2/50* (2013.01); *B60N 2/501* (2013.01); *B60N 2/507* (2013.01); *B60N 2/525* (2013.01); *B60N 2/527* (2013.01)

(58) Field of Classification Search
CPC .............. B60N 2/39; B60N 2/50; B60N 2/52
USPC .......... 296/65.02; 297/250.1, 273, 281, 488; 370/252, 328, 394, 400, 470
See application file for complete search history.

(56) References Cited

U.S. PATENT DOCUMENTS

| | | |
|---|---|---|
| 1,650,178 A | 10/1925 | Atkinson |
| 3,882,956 A | 5/1975 | Plegat |
| 5,107,556 A | 4/1992 | Haider |
| 5,685,605 A | 11/1997 | Kassai et al. |
| 5,950,977 A * | 9/1999 | Proksch .............. B60N 2/502 108/145 |

(Continued)

FOREIGN PATENT DOCUMENTS

| | | |
|---|---|---|
| CH | 704322 A2 | 7/2012 |
| DE | 4425680 A1 | 1/1996 |

(Continued)

OTHER PUBLICATIONS

Extended Search Report for European Patent Application No. 16200164.8, dated May 10, 2017, 3 pages.

(Continued)

*Primary Examiner* — Darrell G Dayoan
*Assistant Examiner* — Sunsurraye Westbrook
(74) *Attorney, Agent, or Firm* — Sheridan Ross PC

(57) ABSTRACT

Vehicle vibration device for a vehicle seat or a vehicle cabin comprising a lower part and an upper part mounted resiliently with respect to the lower part by means of a damping device, the upper part being mounted suspended on the lower part by means of at least one pivot mounting, the at least one first pivot mounting comprising at least one first lever, the first end of which is attached to the lower part by means of a first pivot axis and the second end of which is attached to the upper part by means of a second pivot axis, the second end being positioned below the first end in a vertical direction, at least one dimension of the upper part and/or at least one dimension of the lower part being variable by means of an adjustment device so as to vary the position of the first lever.

11 Claims, 9 Drawing Sheets

(56) References Cited

U.S. PATENT DOCUMENTS

| | | | | |
|---|---|---|---|---|
| 7,246,836 | B2 * | 7/2007 | Hahn | B60N 2/502 296/65.02 |
| 7,568,675 | B2 * | 8/2009 | Catton | B60N 2/502 248/421 |
| 8,308,216 | B2 * | 11/2012 | Bertozzi | B60N 2/002 296/65.02 |
| 8,414,054 | B2 * | 4/2013 | Komatsubara | B60N 2/1814 296/65.02 |
| 8,707,477 | B1 | 4/2014 | Flemister | |
| 8,783,772 | B2 * | 7/2014 | Schuler | B60N 2/502 297/344.15 |
| 9,440,559 | B2 * | 9/2016 | Gundall | B60N 2/508 |
| 2007/0235266 | A1 * | 10/2007 | Dantas | B66B 9/04 187/269 |
| 2013/0069409 | A1 * | 3/2013 | Kolb | B60N 2/502 297/344.1 |
| 2013/0341984 | A1 * | 12/2013 | Olesen | A61G 5/1059 297/344.15 |

FOREIGN PATENT DOCUMENTS

| | | |
|---|---|---|
| DE | 20303429 U1 | 7/2004 |
| DE | 202005009830 U1 | 8/2005 |
| DE | 102005028725 A1 | 1/2006 |
| DE | 102009031417 A1 | 1/2011 |
| DE | 102010053752 A1 | 6/2012 |
| DE | 102015204516 A1 | 9/2016 |
| WO | WO 2007/058572 A1 | 5/2007 |
| WO | WO 2009/054788 | 4/2009 |

OTHER PUBLICATIONS

Search Report prepared by the German Patent Office dated Nov. 2, 2016, for German Patent Application No. 10 2015 121 765.1.

* cited by examiner

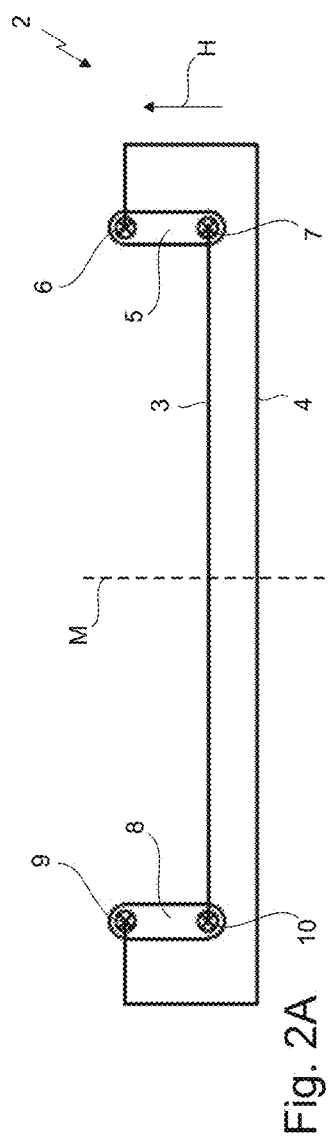
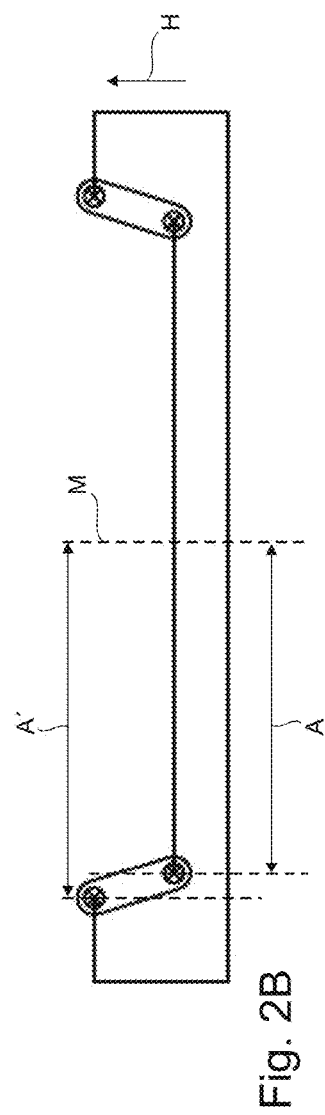
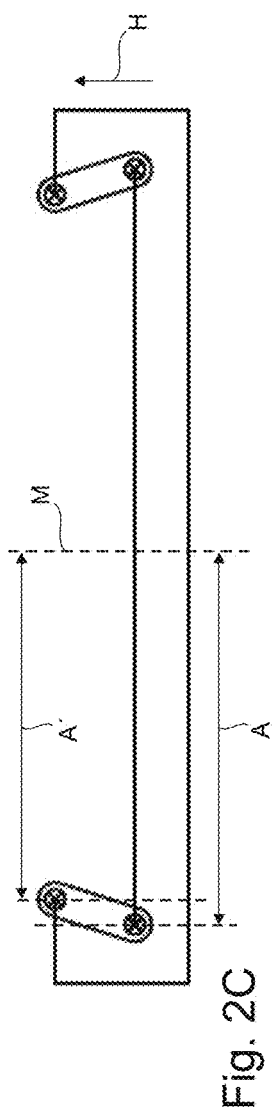

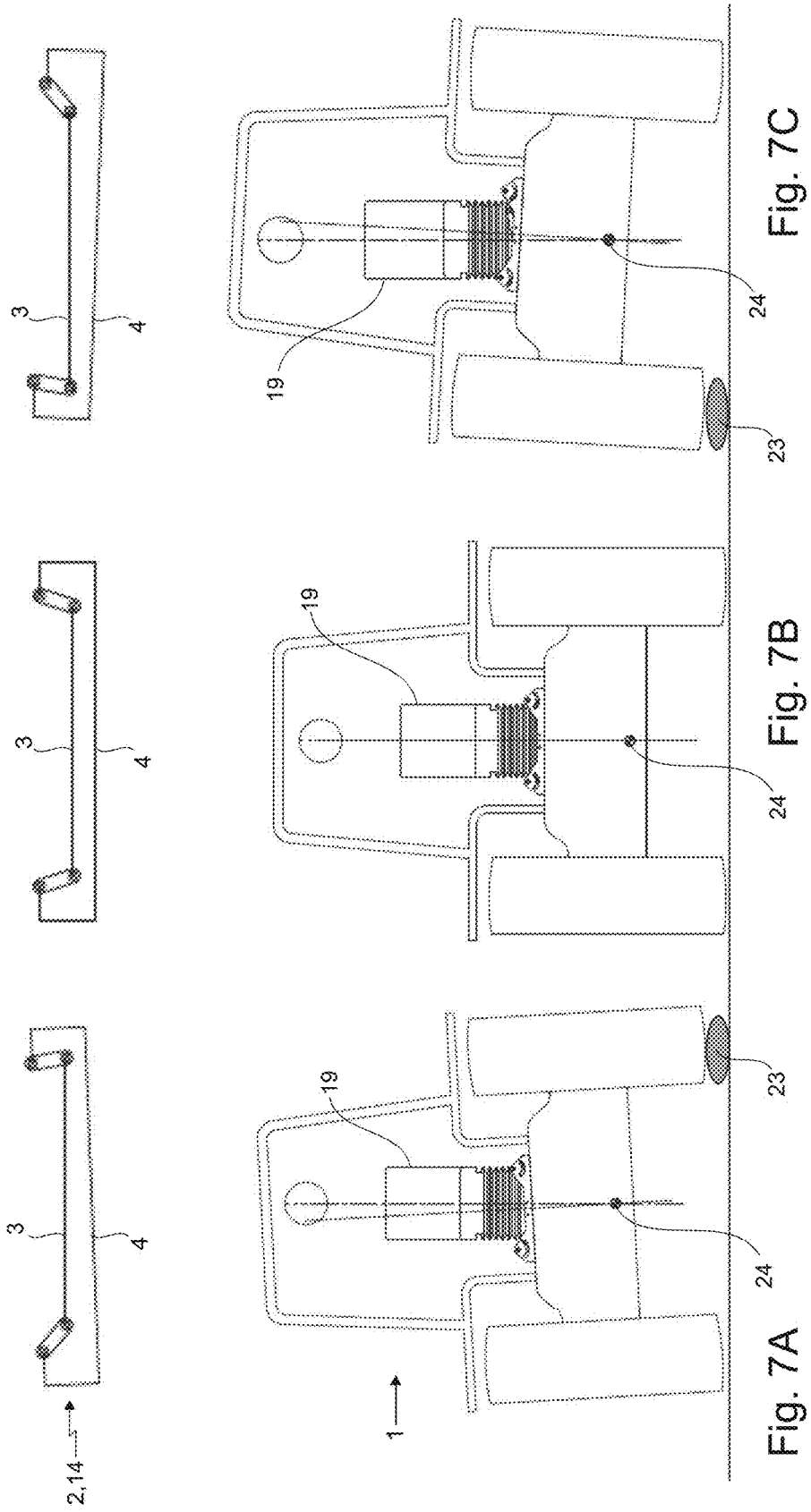

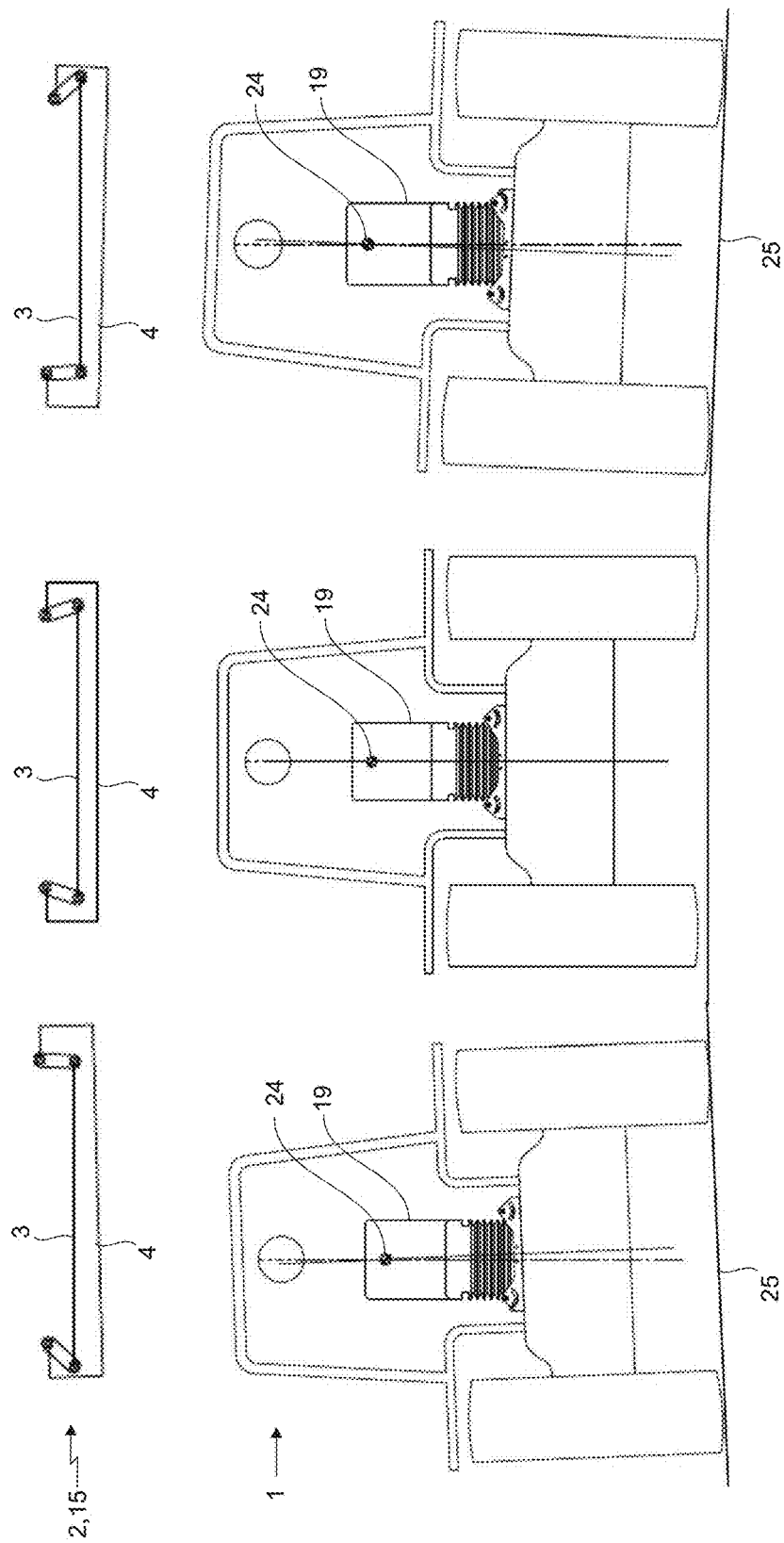

VEHICLE VIBRATION DEVICE

CROSS-REFERENCE TO RELATED APPLICATIONS

This application claims the benefit of German Patent Application No. 10 2015 121 765.1 filed Dec. 14, 2015, the entire contents of which are incorporated herein by reference.

FIELD

The invention relates to a vehicle vibration device for a vehicle seat and/or a vehicle cabin comprising a lower part and an upper part mounted resiliently with respect to the lower part by means of a damping device, the upper part being mounted suspended on the lower part by means of at least one pivot mounting, the at least one first pivot mounting comprising at least one first lever, the first end of which is attached to the lower part by means of a first pivot axis and the second end of which is attached to the upper part by means of a second pivot axis, the second end being positioned below the first end in a vertical direction.

BACKGROUND

During operation of a vehicle, the vehicle can experience various movements as a result of external influences. These are generally translations along the vehicle longitudinal direction, vehicle transverse direction and vehicle vertical direction and rotations about each of these directions, also known as pitch, roll and yaw, the yaw generally not being taken into account.

Vehicle vibration devices known in the art, in particular for vehicle seats, are formed in such a way that they form a vibrating and resilient mounting between an upper part and a lower part, in this case between a vehicle seat part and a lower part of a vehicle seat substructure. For example, a seat part of a vehicle seat may be connected with respect to a lower part, which is fixed to a vehicle cabin floor or a body of the vehicle, by means of scissor arms, spring means and/or damping means additionally being arranged between the upper part and the lower part so as to absorb resiliently vibration orientated in a vertical direction which is introduced into the system of the vehicle seat from the outside.

Likewise, there are horizontal vibration devices which serve to cushion or damp vibrations which are introduced into the system of the vehicle seat in a horizontal direction. For this purpose, the upper part of the vehicle seat is mounted resiliently with respect to the lower part of the vehicle seat in a horizontal direction and can resiliently absorb vibrations introduced in a horizontal or transverse direction.

Further, a vibration device for a vehicle seat or a vehicle cabin is known from DE 10 2010 034 857. The vibration device disclosed therein comprises an upper part which is mounted vibrating with respect to a lower part and which comprises levers which take on a particular position between the upper part and the lower part. The upper part is thus pivoted with respect to the lower part about an imaginary centre of rotation arranged below the upper part.

Since the centre of rotation cannot change position, the device is merely suitable for cushioning short-term rotations of a vehicle well, in particular pitch and roll, but not translations of the vehicle. Further, this arrangement is not suitable for expediently compensating a sloping position of the vehicle.

SUMMARY

Therefore, the object of the present invention is to provide a vehicle vibration device by means of which short-term rotations of the vehicle, translations of the vehicle and sloped travel of the vehicle can be compensated.

This object is achieved by the features of claim 1. Advantageous embodiments of the invention may be found in the dependent claims.

The central idea of the invention is a vehicle vibration device for a vehicle seat or vehicle cabin comprising a lower part and an upper part mounted resiliently with respect to the lower part by means of a damping device, the upper part being mounted suspended on the lower part by means of at least one pivot mounting, the at least one first pivot mounting comprising at least one first lever, the first end of which is attached to the lower part by means of a first pivot axis and the second end of which is attached to the upper part by means of a second pivot axis, at least one dimension of the upper part and/or at least one dimension of the lower part being variable by means of an adjustment device so as to vary the position of the first lever.

By means of the suspended mounting of the upper part with respect to the lower part by means of at least one first lever, rotation about an imaginary axis or real axle, arranged extending in the vehicle width direction or in the vehicle longitudinal direction, is achieved. An imaginary axis is preferred.

Therefore, according to the invention, by varying the position or the location of the first lever by changing at least one dimension of the lower part and/or of the upper part by way of the adjustment device, the position of the imaginary axis or real axle can be varied, preferably in the vehicle vertical direction. By varying the axis, it is possible to describe a rotary field describing the entirety of the positions of the axis.

A position of the first lever means a position of the first lever in space. The position of the first lever can thus be varied by way of translations or rotations.

Herein, the term "dimension" preferably means a length or width. For more precise definition of the term "dimension", the pivot mounting comprises in a first direction, in other words preferably in the longitudinal direction or width direction, at least two different mounting points by means of which the upper part is mounted suspended with respect to the lower part. The term "dimension" means the distance between these two mounting points.

In an embodiment, the at least one dimension is at least one selected from length and width. Preferably, length means an extension in the longitudinal direction and width means an extension in the width direction.

Upon travelling over a bump in the ground, for example the front wheel of the vehicle is deflected upwards or downwards, potentially resulting in a rotational movement about a contact area of a rear tyre. However, the inertia of the driver moves the vehicle seat and thus the driver himself onwards in translation. As a result of the suspended mounting by means of the pivot device, a rotational degree of freedom is provided, in such a way that the rotation of the vehicle upon travelling over a bump in the ground is not imposed on the driver.

In a particularly preferred embodiment, the first pivot mounting comprises at least a second lever, the first end of which is arranged on the lower part by means of a first pivot axis and the second end of which is arranged on the upper part by means of a second pivot axis, the second end being positioned below the first end in the vertical direction.

As a result, particularly advantageous suspended mounting of the upper part with respect to the lower part can be provided.

Particularly preferably, the first pivot mounting is formed axially symmetrically about a central axis of the lower part, making particularly advantageous pivoting of the upper part with respect to the lower part possible. In particular, the displacement is substantially equal in each direction, in particular horizontally.

This is advantageous in particular because, as a result of the installation space and for safety reasons, the horizontal displacement is limited to approximately 50 mm total travel, corresponding to a displacement of 25 mm left and right or forwards and backwards.

In a further preferred embodiment, the vehicle vibration device comprises at least one second pivot mounting. Advantageously, the lower part and the upper part can be interconnected by means of the at least one first and at least one second pivot mounting.

Advantageously, the first pivot mounting and the second pivot mounting each comprise at least one lever, the first end of which is pivotably attached to the lower part by means of a first pivot axis and the second end of which is pivotably attached to the upper part by means of a second pivot axis, the second end being positioned above the first end. This means that the upper part is suspended on the lower part, suspended from downwardly or obliquely downwardly pointing lever arms, said lower part for example extending laterally upwards to the left and right side of the upper type or extending laterally upwards in the front and rear region of the upper part.

Because according to the invention the position or the location of the first lever is variable in position by changing a dimension of the upper part and/or of the lower part, it is therefore also possible to vary the position of the imaginary axis or real axle. By changing the dimension of the upper part and/or of the lower part, the position of the entire first lever in space is varied, in other words the type of pivot mounting is also variable in this way. In principle, three fundamentally different settings of the first lever are possible.

It is naturally also conceivable for the position of the second lever to be variable by means of the adjustment device, in the same or a similar manner to the position variation of the first lever.

The first setting is for the lever to be orientated in the vehicle vertical direction. The second setting is for the lever to be arranged obliquely downwards and inwards starting from the first end thereof. The third setting is for the lever to be arranged obliquely downwards and obliquely outwards starting from the first end thereof.

By means of the adjustment device, and in particular by actuating the adjustment device, it is therefore possible to change between these three settings. Preferably, this is a continuous adjustment, in such a way that every conceivable position between the different settings is conceivable. The first end of the first lever is therefore movable continuously and without interruption by means of the adjustment device.

In a preferred embodiment, the adjustment device can be arranged on the upper part or the lower part. This results in a particularly simple construction of the adjustment device and accordingly of the vehicle vibration device, since only a dimensioning or dimensionings of either the lower part or the upper part have to be carried out. So, for example, if the length of the lower part is varied, the upper part is not varied.

However, in another preferred embodiment, two adjustment devices are provided. An adjustment device can be arranged on each of the lower part and the upper part. This means that the dimension or dimensions of both the lower part and the upper part are variable. As a result, it is perfectly possible to vary the position of the first lever by varying the dimensions of the upper part and of the lower part. As a result, it is possible to vary the position of the first lever and preferably also of the second lever.

Various embodiments for the adjustment device are conceivable. In a preferred first embodiment, the adjustment device comprises at least one extension element, the first and/or second end of the first lever being fixable thereto. If the extension element is only connected to the upper face, the second end of the first lever is connected to the extension element. If the extension element is only connected to the lower face, the first end of the first lever is connectable to the extension element.

An extension element means an element of the adjustment device which changes position in space as a result of the adjustment device being actuated, preferably along a predeterminable displacement curve. Because the first lever and if appropriate also the second lever are connectable to the extension element, when the adjustment device is actuated, this being accompanied by a change in position of the extension element, the position of the first and if appropriate of the second lever varies.

In a particularly preferred embodiment, the adjustment device comprises at least two extension elements. Also advantageously, the extension elements are arranged opposite in a spatial direction, the first or second end of the first lever being arrangeable on the first extension element and the first or second end of the second lever being arrangeable on the second extension element.

Preferably, the first and second extension element can be arranged on the lower face or on the upper face. However, it is also conceivable for the first extension element to be arrangeable on the upper face and the second extension element to be arrangeable on the lower face, the first end of the first lever being connectable to the second extension element and the second end thereof being connectable to the first extension element.

In a further preferred embodiment, when the adjustment device is actuated, the at least one extension element is displaceable in a spatial direction. In this context, a spatial direction is the longitudinal direction or the width direction. Depending on the configuration of the adjustment device, it is also conceivable for a small portion also to be displaceable in the vertical direction.

This means that the position of the first end of the lever is variable by pivoting the lever element of the lower part.

In a particularly preferred embodiment, the adjustment device comprises at least one crank element arranged on the lower part and having a first and a second end, a first end of a first extension element being pivotably arranged at least on the first end of the crank element, and a second end of the first piston rod being pivotably connectable to the first lever. Preferably, the crank element is mounted rotatably about an axis of rotation. Particularly advantageously, the first piston rod comprises a guide pin which is connectable to a guide slide. When the adjustment device is actuated, the guide pin is displaced in the guide slide and as a result the piston rod is correspondingly displaced. In particular, the guide slide is configured in such a way that the guide pin is linearly displaceable. However, other configurations of the guide slide are also conceivable.

By way of the actuation of the crank element and the resulting movement of the piston rod, it is thus possible to vary the position of the first extension element and thus to vary the position of the first lever in space.

In a more preferred embodiment, a first end of a second extension element is arrangeable on the second end of the crank element and the second piston rod is connected to at least one second lever by means of a second end of the extension element. Preferably, the second extension element also comprises a guide pin which is mounted guidably in a corresponding guide slide. Preferably, the guide slides of the first and second extension element are configured in such a way that the first and second lever can be moved identically.

Depending on the arrangement of the extension elements, in other words on the lower part and/or the upper part, the extension element is connectable to either the first or the second end of the first or the second lever respectively.

Another option for the configuration of the adjustment device is for the adjustment device to comprise at least one actuator. This actuator is preferably connectable to the lower part or the upper part. Further, the actuator is preferably connectable to the first and if applicable second extension element.

The actuator may be formed mechanically, pneumatically or hydraulically. Preferably, the actuator is a hydraulic lifting cylinder. It is also conceivable for the actuator to be formed as a fulcrum shaft or the like which is variable in longitudinal extension as a result of actuation.

Further, in a preferred embodiment, it is conceivable for the adjustment means to be actuable manually or automatically.

Manual actuation of the adjustment device can be carried out for example by the driver, who in this case for example actuates the adjustment device by hand and can adapt the position of the first end of the first lever in accordance with the current travel situation.

Alternatively or additionally it is conceivable for the adjustment device to be actuated automatically, preferably by means of an actuation device. In this context, it is thus conceivable for it to be detectable by means of sensors, for example acceleration sensors and position sensors, whichever travel situation currently applies. Thus for example it can be detected by means of a position sensor whether or not the vehicle is in a sloping position. A position sensor may in particular be an angle sensor, in such a way that relatively long sloped travel can advantageously be detected well. Using an acceleration sensor, it can be detected whether or not a bump in the ground is being travelled over.

The data captured by the sensors are preferably analysed by an arithmetic unit, and the arithmetic unit activates the actuation device accordingly, the adjustment means thus being actuated by means of the actuation device.

In a further embodiment, it is also conceivable for both manual and automatic actuation to be conceivable. Thus, the driver can set, in particular pre-set, a particular travel situation if it is foreseeable what requirements are needed. For example, consider a driver who is travelling in a vineyard using the vehicle. The preferred pre-setting is the sloping position setting. Nevertheless, by means of the automatic actuation it is subsequently possible to be able to react to an unpredictable bump in the ground. After travelling over a bump in the ground of this type, the sloping position compensation can be activated again by means of the arithmetic unit.

In a preferred embodiment, it may be provided that a pivot movement of the pivotable upper part can be loaded with a damping force countering the pivot movement by means of a damping device, the damping device being connectable to a first lever. Alternatively, the damping device may be arranged between the upper part and the lower part.

As a result of this arrangement, it is possible to reduce the pivot movement of the upper part with respect to the lower part particularly well.

In a further preferred embodiment, the lower part is a vehicle seat lower part connected to a vehicle body part or frame and/or to a vehicle cabin part.

Depending on what kinematics are provided, there is a different imaginary axis about which the lower part is rotated for the kinematics in question. For the kinematics of rotational isolation, the axis is located below the lower part; for the kinematics of the sloping position compensation, the axis is located above the lower part. The kinematics for translational isolation are a special case, since in this case the axis is located at infinity. It can therefore be arranged above or below the lower part.

The underlying situation for rotational isolation and for sloped position compensation is the same in so far as the vehicle undergoes a rotation, either as a result of travelling over a bump in the ground or through travelling through a sloping position.

However, for a driver there is fundamental difference. During rotational isolation, the driver is normally sitting on the vehicle seat in a horizontal position, in such a way that he briefly accepts displacements, which may even be large in some cases. During sloping position compensation, the utility vehicle is tilted with respect to the horizontal for a relatively long time, and as a result the driver does not desire a large displacement from his original position.

In particular, it is possible to set the sloping position compensation in such a way that the imaginary axis is located in the region of the upper body of the driver, whilst during rotational isolation the axis is always arranged on the vehicle side and below the driver. Therefore, changing between sloping position compensation and rotational isolation cause the reference system of the vehicle and driver to change. This makes it possible to set the best kinematics for the driver in accordance with his travel situation.

Further advantageous embodiments may be derived from the dependent claims.

BRIEF DESCRIPTION OF THE DRAWINGS

Further aims, advantages and expediencies of the present invention may be derived from the following description in connection with the drawings, in which:

FIG. 2A is a schematic drawing of translational isolation;

FIG. 2B is a schematic drawing of rotational isolation;

FIG. 2C is a schematic drawing of sloping position compensation;

FIG. 7A-7C show rotational isolation kinematics for various travel positions;

FIG. 8A-8C show sloping position compensation kinematics for various travel positions;

DETAILED DESCRIPTION

Figure 1:
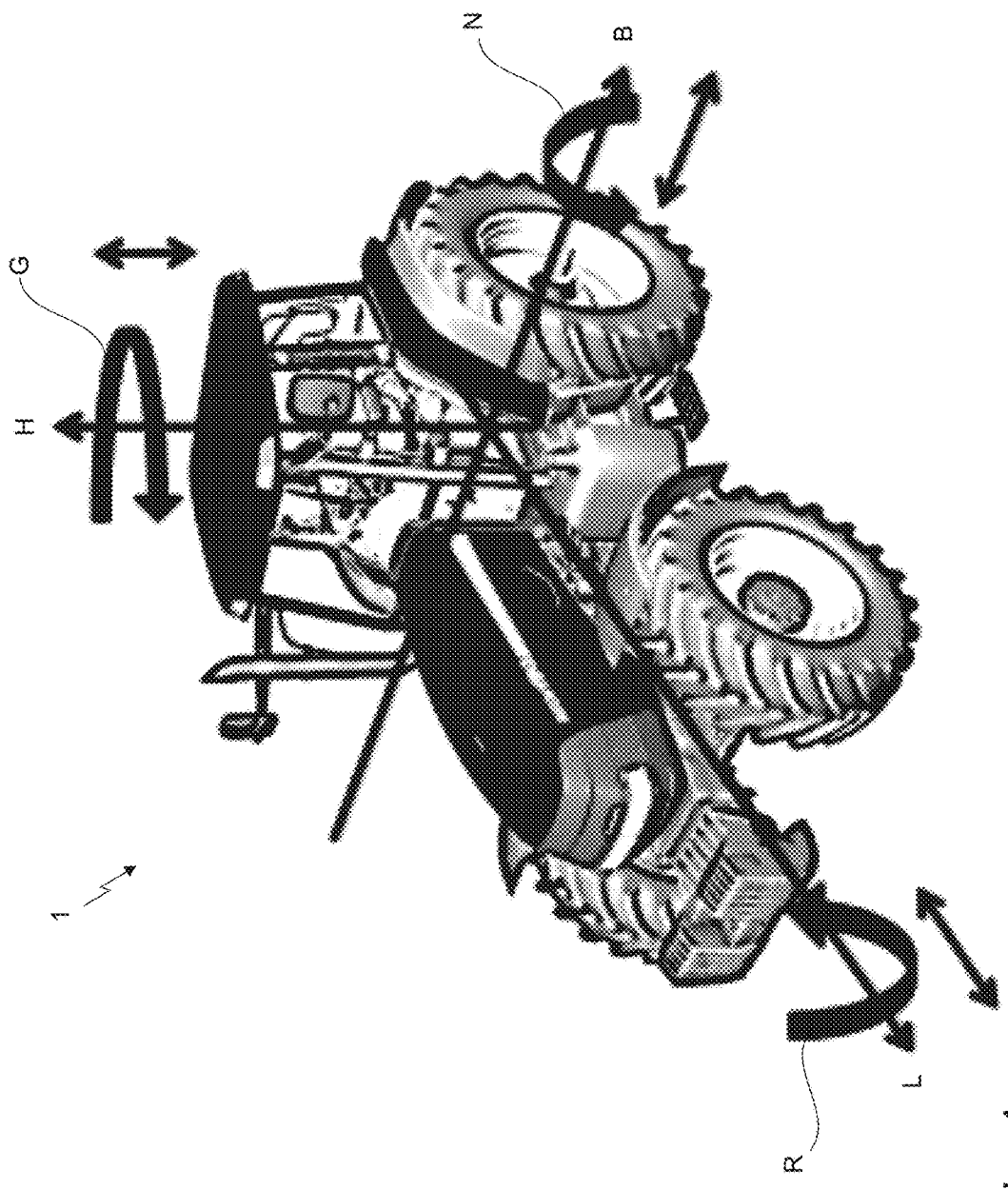
FIG. 1 shows a utility vehicle having the various movement options.

The utility vehicle 1 shown in FIG. 1 demonstrates the typical movements of the utility vehicle, naturally depending on the relevant travel situation. In this context, translations of the utility vehicle may occur in the vehicle longitudinal direction L, the vehicle width direction B and the vehicle vertical direction H. Further, rotations may occur about each of these axes L, B, H, rotation about the longitudinal axis L being known as roll R, rotation about the transverse direction B being known as pitch N, and rotation about the vertical axis H being known as yaw G. Typically, yaw is ignored for vehicles.

According to the invention, it is possible to compensate these movements, apart from the yaw, which can be ignored, by means of the vehicle vibration device 2.

The three fundamentally different settings of the vehicle vibration device 2 are shown in FIGS. 2A, 2B and 2C. The drawings may be at different scales. FIG. 2A-2C have comparatively different dimensions of the upper part 3. These settings are adopted when there is no vibration of the upper part 3 with respect to the lower part 4, in other words no external interference or the like.

FIG. 2A shows a first setting, in particular of the first end 6 of the first lever 5. The first end 6 of the first lever 5 is arranged above the second end 7 of the first lever 5 in the vertical direction H. In addition, a second lever 8 can be seen, the first end 9 of the second lever 8 being connected to the lower part 4 and the second end 10 thereof being connected to the upper part 3. Thus, in the present case, the first lever 5 and second lever 8 are formed mutually parallel and extend in the vertical direction H. The schematic vehicle vibration device 2 shown is axially symmetrical about the central axis M of the lower part 4. The first ends 6, 9 and second ends 7, 10 form a parallelogram; if the upper part 3 pivots with respect to the lower part 4, the upper part 3 and the lower part 4 remain mutually parallel. This setting is preferred in particular for isolating translations, and is referred to in the following as translational isolation 13.

Similarly to FIG. 2A, FIG. 2B shows a first lever 5 and a second lever 8, the distance A of the respective second ends 7, 10 from the central axis M being less than the distance A'. The second ends 7, 10 are thus placed further inwards. If the upper part 3 pivots with respect to the lower part 4, the upper part 3 is no longer parallel to the lower part 4. This suspension describes in particular a rotation of the upper part 3 about an imaginary axis 11 arranged below the upper part 3. This setting is preferred in particular for isolating roll and pitch movements, and is referred to in the following as rotational isolation 14.

FIG. 2C shows the same components as 2A and 2B, but the distance A of the first ends 7, 10 from the central axis M is greater than the distance A' of the second ends from the central Axis M. The second ends 7, 10 are thus placed further outwards. If the upper part 3 pivots with respect to the lower part 4, the upper part 3 is no longer parallel to the lower part 4. This suspension describes in particular a rotation of the upper part 3 about an imaginary axis 11 arranged above the upper part 3. This setting is preferred in particular for isolation of sloping positions and of roll and pitch movements, and is referred to in the following as sloping position compensation 15.

Figure 3:
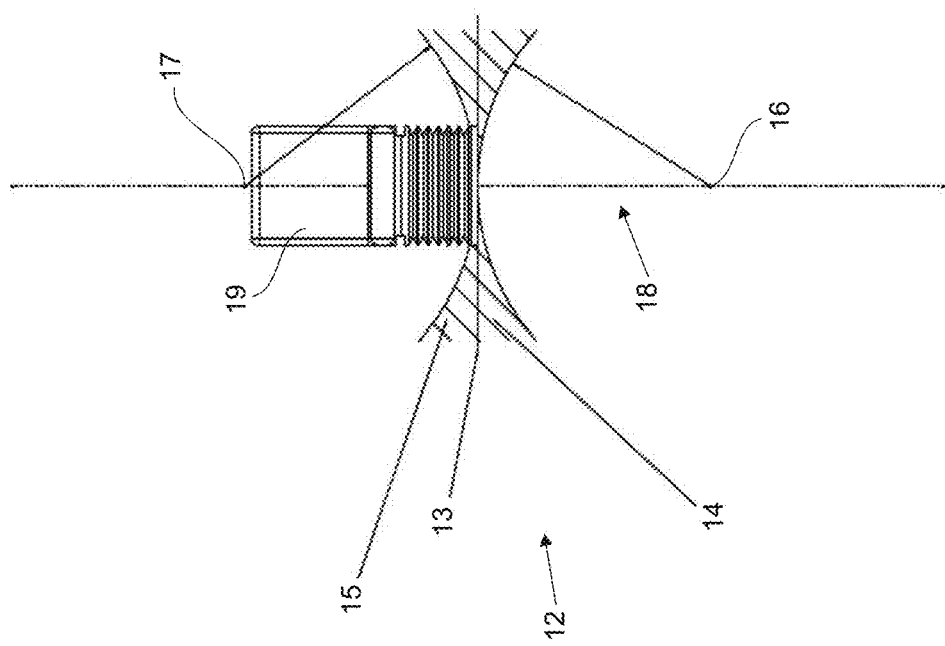
FIG. 3 is a schematic drawing of the adjustment region.

A possible adjustment range 12 and the position of the imaginary axis 11 can be seen particularly clearly from FIG. 3.

By way of example, an axis of rotation 16 for rotational isolation and an axis of rotation 17 for sloping position compensation are given. The axis of rotation 16 is arranged below the upper part 3 and in particular below the lower part 4, and the axis of rotation 17 is arranged above the upper part 3 or above the lower part 4.

If the axis of rotation 16 is located below the upper part 3, a convex situation is described, the system consisting of the vehicle vibration device 2 and in the present case a vehicle seat 19 above an arc. The movement of the system substantially corresponds to the arc progression or is approximated in accordance with the present kinematics.

The straight line 13 gives the translational isolation 13. Since during translational isolation 13 the system moves along the straight line 13, there is no axis of rotation or centre of rotation. As a result of constructional tolerances and deviations, however, an axis of rotation located at infinity can be assumed.

If the axis of rotation 17 is located above the lower part 4 and/or above the upper part 3, this is a concave situation, in other words the system moves within the variable arc.

The axis 18 represents a possible rotary field or field of axes of rotation, in other words the axis of rotation can take on any value in the rotary field 18, depending on the current or desired travel situation.

Figure 4A:
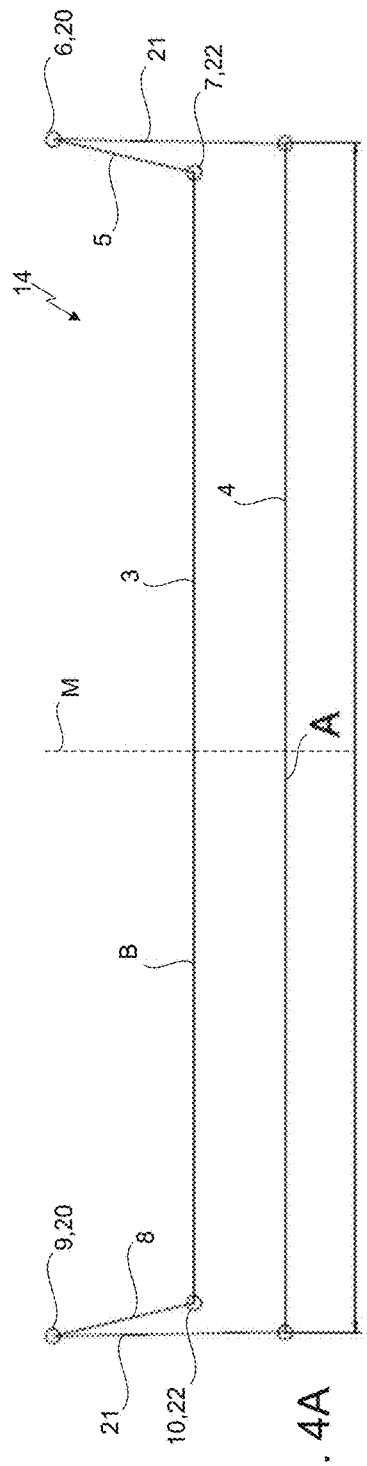
FIG. 4A-4C show kinematics as a dimension A varies.
Figure 4B:
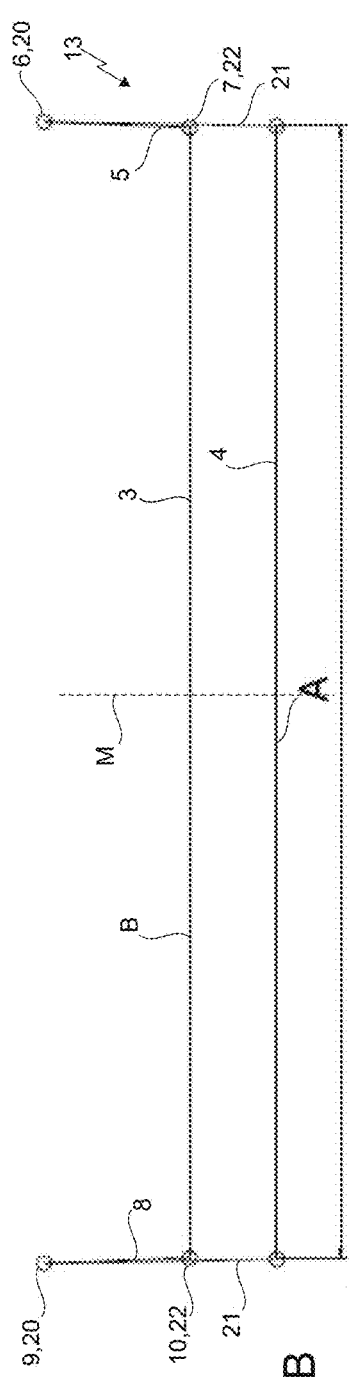
Figure 4C:
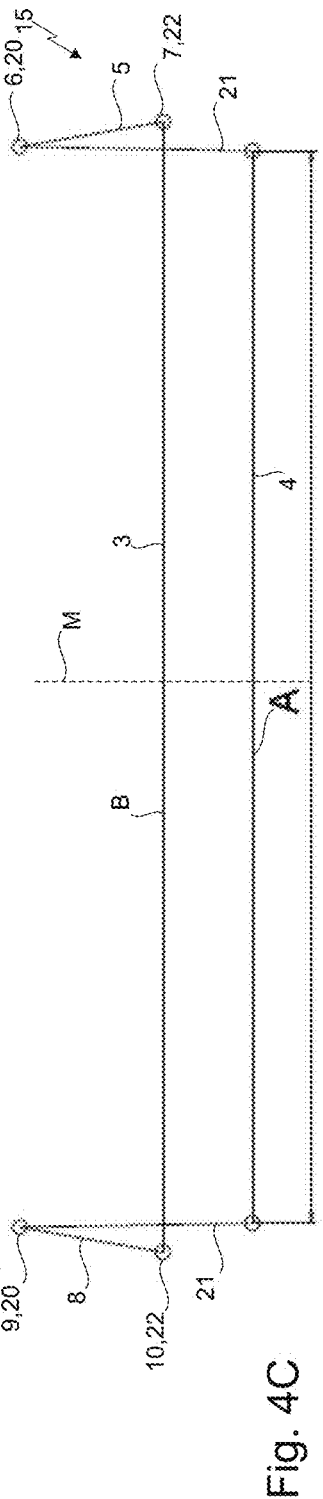

FIG. 4A-4C schematically show how varying the dimension A, in other words the dimension of the lower part 4, leads to a variation in the position of the first lever 5.

FIG. 4A shows the vehicle vibration device 1 in the setting for rotary isolation 14, FIG. 4B shows the vehicle vibration device 1 in the setting for translational isolation 13, and FIG. 4C shows the vehicle vibration device in the setting for sloping position compensation 15.

FIG. 4A-4C show an upper part 3, which is mounted suspended with respect to the lower part 4 by means of a first lever 5 and a second lever 8, the second ends 7, 10 being connected to the upper part 3 and the first ends 6, 9 being connected to the lower part 4. In particular, the first ends 6, 9 are connected to the lower part 4 by means of a suspension element 21. In the present case, the suspension elements 21 are arranged extending in the vertical direction H, it also being possible for the suspension elements 21 to be arranged at an angle to the vertical direction H.

The lower part comprises mounting points 21, which substantially correspond to the first ends 6, 9. According to the invention, a dimension A is defined as the distance between the mounting points of the lower part 4 or of the upper part 3. The dimension B is accordingly between the mounting points 22, which substantially correspond to the second ends 7, 10.

Since the suspension elements 21 are arranged substantially perpendicular to the lower face 4, the dimension A is equivalent to the length or width of the lower face 4. The dimension A is therefore shown corresponding to the lower face 4 for clarity.

In FIG. 4A-4C, the dimension B of the upper face 3 should be considered constant.

In FIG. 4A, it can be seen that the dimension A is greater than the dimension B. As a result, the levers 5, 8 are arranged extending obliquely downwards, the second ends 7, 10 being arranged closer than the first ends 6, 9 to the central axis M of the lower part 4.

By contrast, in FIG. 4B the dimension A is equal to the dimension B, in other words the mounting points 20, 22 are arranged above one another in the vertical direction.

In FIG. 4C, the dimension A is less than the dimension B, in such a way that the second ends 7, 10 of the levers 5, 8 are further away than the first ends 6, 9 from the central axis M of the lower part 4. The levers extend obliquely downwards in this case too.

FIG. 5A-5C again schematically show the vehicle vibration device 1, the dimension B of the upper part being varied in this case whilst the dimension A is constant.

Figure 5A:
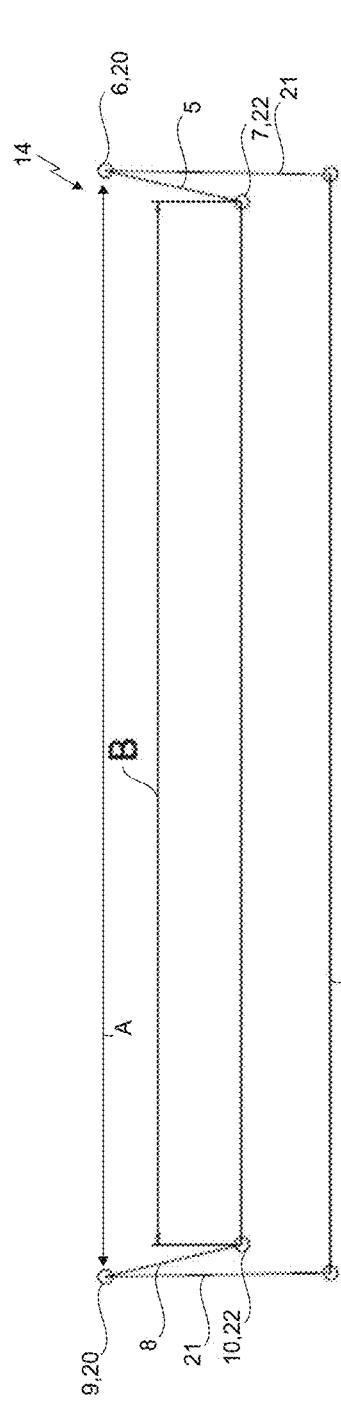
FIG. 5A-5C show kinematics as a dimension B varies.
Figure 5B:
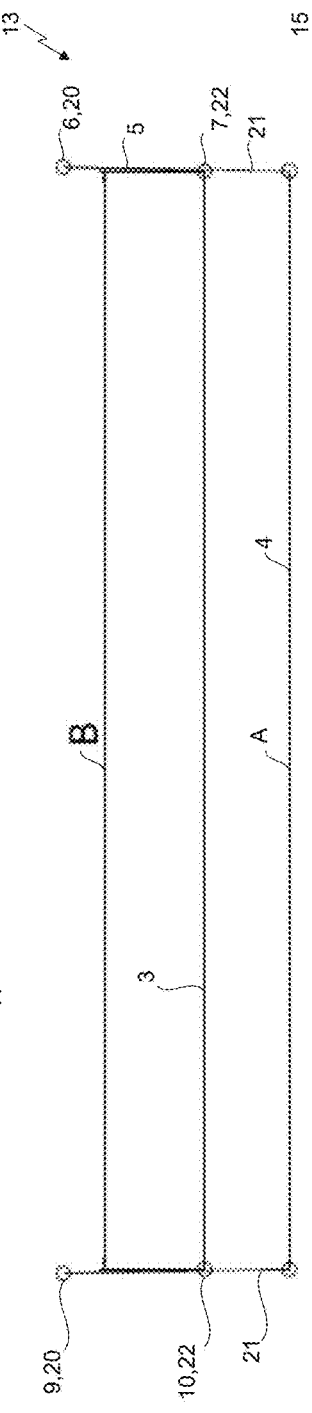
Figure 5C:
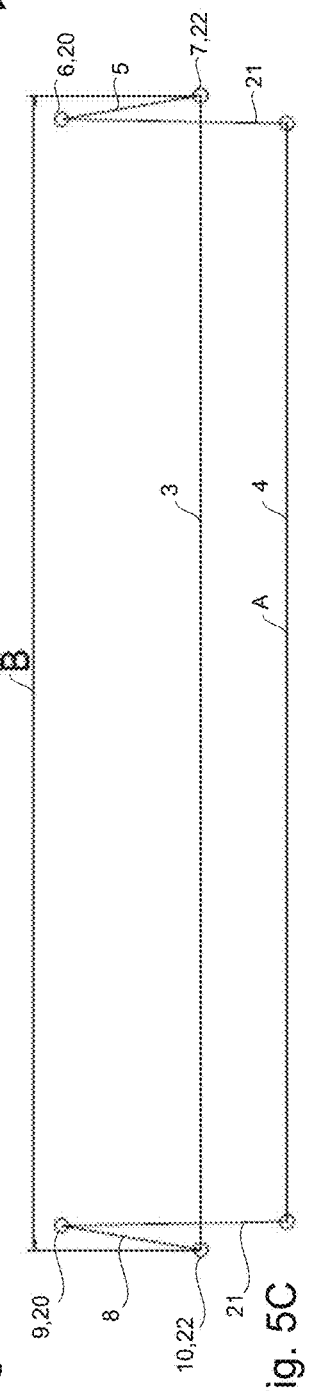

FIG. 5A shows the vehicle vibration device 1 in the setting for rotational isolation 14, FIG. 5B shows the vehicle vibration device 1 in the setting for translational isolation 13, and FIG. 5C shows the vehicle vibration device 1 in the setting for sloped position compensation 15.

FIGS. 6A-6C, 7A-7C and 8A-8C again show the different situations along with the respective, associated kinematics of the vehicle vibration device 2. The kinematics are shown without the adjustment device 26.

The drawings show the utility vehicle 1 comprising the vehicle seat 19, which is mounted on the upper part 3, the lower part 4 being connected to the body of the utility vehicle 1.

Figure 6A:
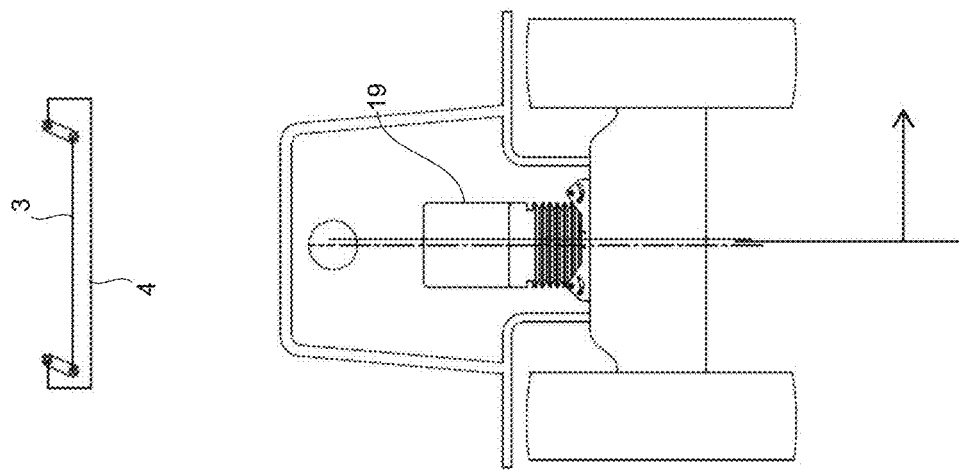
FIG. 6A-6C show translational isolation kinematics for various travel positions.
Figure 6B:
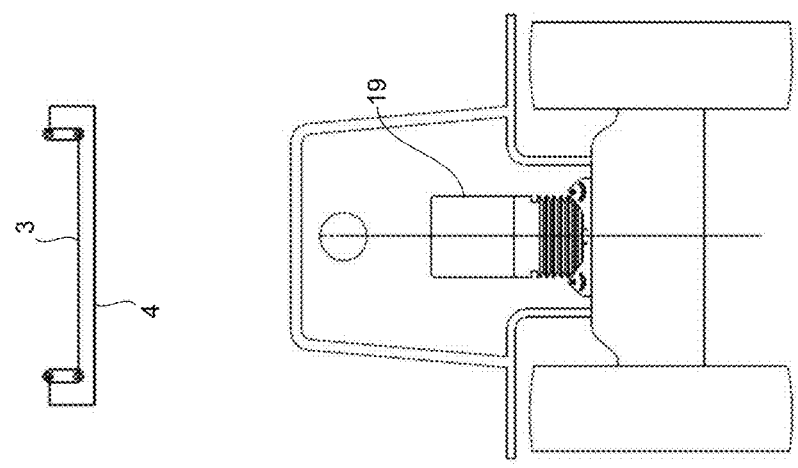
Figure 6C:
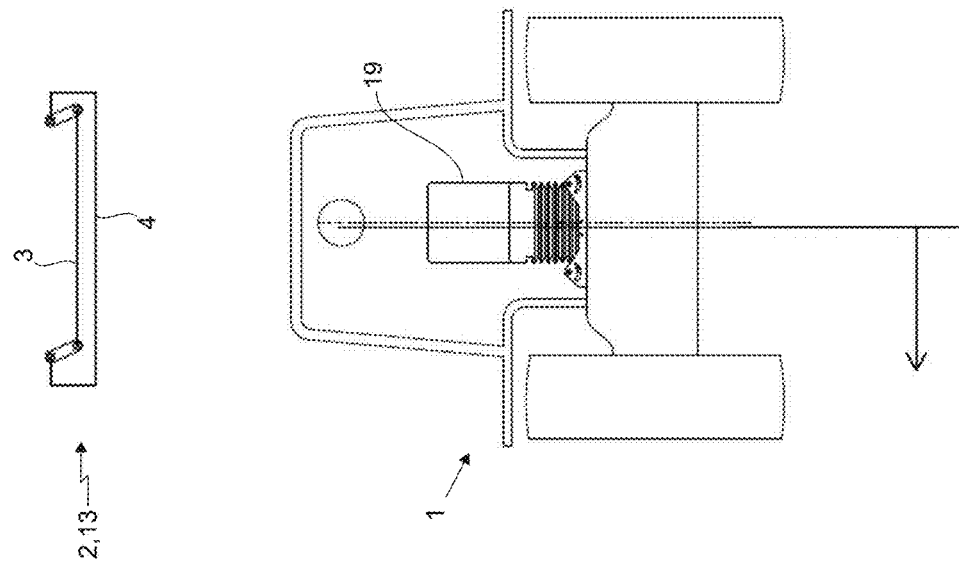

FIG. 6A-6C show the situation of translational isolation 13, in other words the utility vehicle 1 is undergoing a translation, for example as a result of the use of a trailer (not shown). The kinematics of the vehicle vibration device 2 are shown above in each case. FIG. 6B shows the utility vehicle 1 without any external influence, in other words there is no force acting on the vehicle 1. FIG. 6A shows a translation to the left as a result of a force acting on the vehicle 1 from the right. Correspondingly, FIG. 6C shows a translation to the right as a result of a force acting from the left. By comparing the kinematics, it can be seen in particular that the upper part 3 is always orientated parallel to the lower part 4.

FIG. 7A-7C show the situation of rotational isolation 14, in other words the utility vehicle 1 is undergoing a rotation as a result of travelling over a bump 23 in the ground. Similarly, the kinematics of the vehicle vibration device are shown above in each case. FIG. 7B shows the utility vehicle 1 without any external influence, in other words there is no force acting on the vehicle 1. FIG. 7A shows the utility vehicle 1 travelling over the bump 23 in the ground, in such a way that the vehicle 1 experiences an anticlockwise rotation. As a result of the underlying kinematics, the vehicle seat 19 undergoes a rotation about an imaginary axis, which is arranged below the vehicle vibration device 2 and in particular below the lower part 4. If the vehicle 1 undergoes a clockwise rotation, as shown in FIG. 7C, the vehicle seat 19 undergoes an anticlockwise rotation.

FIG. 8A-8C show the situation of sloping position compensation 15, in other words the vehicle 1 is travelling along a sloping position 25. FIG. 8B shows the situation when the vehicle is not travelling over a slope. By contrast, FIG. 8B shows the situation where the vehicle 1 is travelling over a slope 25 descending to the left. As a result of the underlying kinematics of the vehicle vibration device 2, the vehicle seat 19 undergoes a clockwise rotation about an axis 24, the axis 24 being arranged above the vehicle vibration device 2 and in particular above the lower part 4. As a result of this arrangement, the reference system is displaced to the body of the driver, in such a way that when in a sloping position the driver experiences no or only a slight displacement from the usual seat position. The same applies to a slope 25 descending to the right, as shown in FIG. 8C. The vehicle seat 19 undergoes a slight anticlockwise rotation about the axis 24.

The following drawings provide various embodiments of how the dimension A or the dimension B can be varied by means of an adjustment device 26. The embodiments are merely shown schematically, and so some elements may be shown exaggerated in size.

Figure 9A:
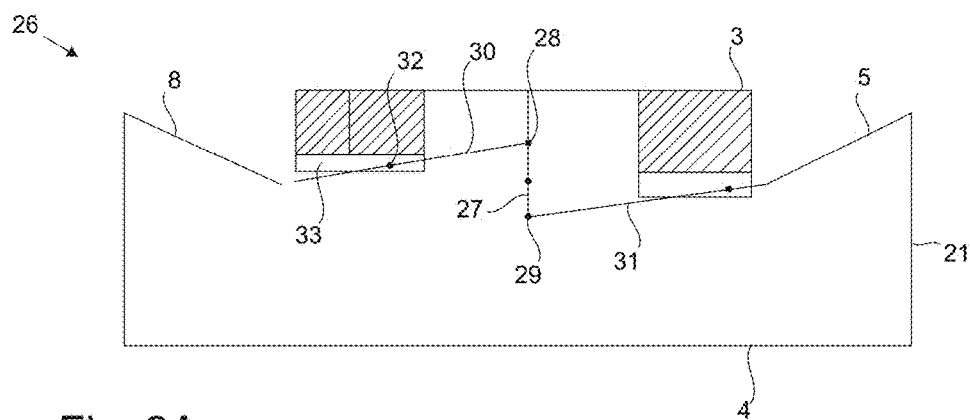
FIG. 9A-9D show a vehicle vibration device in accordance with FIG. 8 rotational isolation.

FIG. 9A shows a first embodiment of the adjustment device 26. The adjustment device is arranged below the upper part 3 and comprises a crank element 27 having a first end 28 and a second end 29, a first extension element 30 being pivotably arranged on the first end 28 and a second extension element 31 being pivotably arranged on the second end 29. Further, the extension elements 30, 31 are pivotably connected to the first lever 5 and second lever 8 respectively. If the adjustment device is actuated, meaning that the crank element 27 is rotated, the extension elements 30, 31 are also actuated. Preferably, the extension elements 30, 31 comprise a guide pin 32 which is in contact with a guide slide 33. By means of the guide slide 33, the extension elements 30, 31 can be displaced in a guided manner. Since the extension elements 30, 31 are pivotably connected to the levers 5, 8, a dimension of the upper part 3 can be varied accordingly.

Figure 9B:
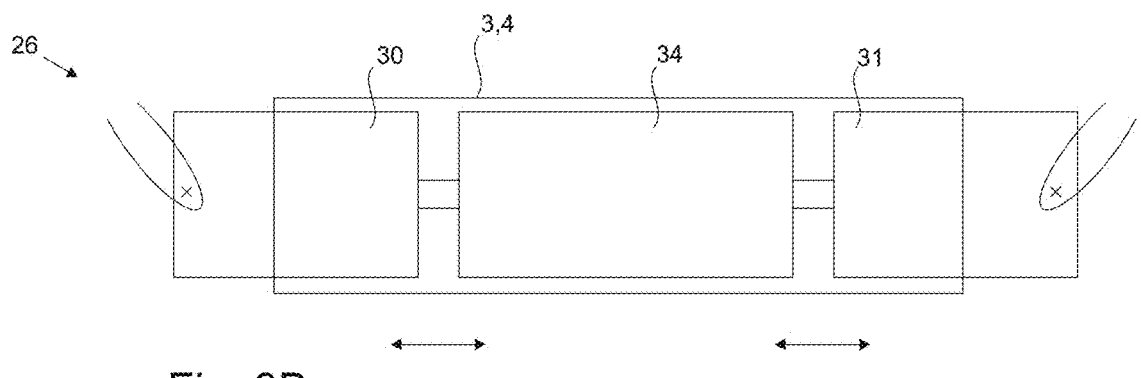

Another embodiment is shown in FIG. 9B. As can be seen, in this case the extension elements 30, 31 are arranged inside the upper part 3 and connected to an actuation element 34.

By actuating the actuation element, the extension elements 30, 31 can be displaced along the arrows shown. The levers 5, 8, as shown, or the suspension elements 21 of the lower part 4 may be fixed to the outer ends.

Figure 9C:
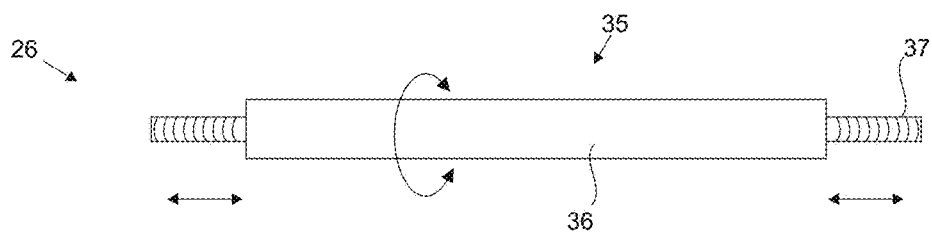

FIG. 9C shows a first embodiment of the actuation element 34. In this case, the actuation element 34 is formed as a fulcrum shaft 35, the fulcrum shaft 35 comprising a housing 36, by means of which threaded rods 37 can be moved, in the present case along the arrows shown, by rotating the housing 36.

Figure 9D:
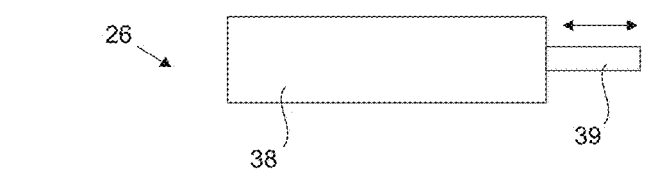

FIG. 9D shows a second embodiment of the actuation element 34. In this case, the actuation element 34 is formed as a lifting cylinder 38 comprising a piston rod 39.

All features disclosed in the application documents are claimed as subject matter of the invention if they are novel in respect of the prior art individually or in combination.

LIST OF REFERENCE NUMERALS

1 Utility vehicle
2 Vehicle vibration device
3 Upper part
4 Lower part
5 First lever
6 First end of first lever
7 Second end of first lever
8 Second lever
9 First end of second lever
10 Second end of second lever
11 Axis
12 Adjustment range
13 Translational isolation
14 Rotational isolation
15 Sloping position compensation
16 Axis of rotation for rotational isolation
17 Axis of rotation for sloping position compensation
18 Rotary field
19 Vehicle seat
20 Mounting point
21 Suspension element
22 Mounting point
23 Bump in the ground
24 Axis
25 Sloping position
26 Adjustment device
27 Crank element
28 First end of crank element
29 Second end of crank element
30 First extension element
31 Second extension element
32 Guide pin 33 Guide slide
34 Actuation element
35 Fulcrum shaft
36 Housing
37 Threaded rod
38 Lifting cylinder
39 Piston rod
B Width direction
L Longitudinal direction
H Vertical direction

What is claimed is:

1. A vehicle vibration device for a vehicle seat or a vehicle cabin, comprising:
    a lower part and an upper part mounted resiliently with respect to the lower part by a damping device,
    at least one first pivot mounting that suspends the upper part on the lower part, the at least one first pivot mounting comprising at least one first lever, the first end of which is attached to the lower part by a first pivot axis and the second end of which is attached to the upper part by a second pivot axis, the second end being positioned below the first end in a vertical direction,
    an adjustment device configured to vary at least one dimension of the upper part and/or at least one dimension of the lower part to vary the position of the first lever.

2. The vehicle vibration device according to claim 1, wherein the first pivot mounting comprises at least a second lever, the first end of which is arranged on the lower part by a first pivot axis and the second end of which is arranged on the upper part by a second pivot axis, the second end being positioned below the first end in the vertical direction.

3. The vehicle vibration device according to claim 1, wherein the vehicle vibration device comprises at least one second pivot mounting, and the lower part and the upper part can be interconnected by the at least one first and at least one second pivot mounting.

4. The vehicle vibration device according to claim 1, wherein the at least one dimension is at least one selected from length and width.

5. The vehicle vibration device according to claim 1, wherein the adjustment device can be arranged on the upper part or the lower part.

6. The vehicle vibration device according to claim 1, wherein two adjustment devices are provided, an adjustment device being arrangeable on the lower part and the upper part respectively.

7. The vehicle vibration device according to claim 1, wherein the adjustment device comprises at least one extension element, the first or second end of the first lever being fixable thereto.

8. The vehicle vibration device according to claim 7, wherein the adjustment device comprises at least two extension elements, the two extension elements being arrangeable opposite in a spatial direction, and the first or second end of the first lever being arrangeable on the first extension element and the first or second end of the second lever being arrangeable on the second extension element.

9. The vehicle vibration device according to claim 7, wherein, when the adjustment device is actuated, the extension element is displaceable in a spatial direction.

10. The vehicle vibration device according to claim 7, wherein the extension element is actuable by a fulcrum shaft and/or a pneumatic or hydraulic cylinder, the extension element being displaceable by a friction bearing and/or a roller bearing.

11. A vehicle vibration device for one of a vehicle seat and a vehicle cabin, comprising:
    an upper part connected to one of a vehicle seat and a vehicle cabin;
    a lower part connected to one of a vehicle body part and a vehicle cabin part;
    a first pivot mounting that suspends the upper part on the lower part, the first pivot mounting having:
        a first lever connected to the lower part at a first pivot axis and connected to the upper part at a second pivot axis, wherein the first pivot axis of the first lever is positioned above the second pivot axis of the first lever in a vertical direction;
        a second lever connected to the lower part at a first pivot axis and connected to the upper part at a second pivot axis, wherein the first pivot axis of the second lever is positioned above the second pivot axis of the second lever in the vertical direction;
    a second pivot mounting that suspends the upper part on the lower part; and
    an adjustment device configured to vary at least one of a distance between the first pivot axis of the first lever and the first pivot axis of the second lever and a distance between the second pivot axis of the first lever and the second pivot axis of the second lever.

* * * * *